(12) United States Patent
Morioka et al.

(10) Patent No.: US 6,838,039 B2
(45) Date of Patent: Jan. 4, 2005

(54) FILM ROLL BODY AND METHOD OF MANUFACTURING FILM ROLL BODY

(75) Inventors: Satoko Morioka, Kyoto (JP); Takashi Ichinomiya, Takatsuki (JP)

(73) Assignee: Toray Industries, Inc. (JP)

(*) Notice: Subject to any disclaimer, the term of this patent is extended or adjusted under 35 U.S.C. 154(b) by 0 days.

(21) Appl. No.: 10/130,653

(22) PCT Filed: Sep. 18, 2001

(86) PCT No.: PCT/JP01/08099

§ 371 (c)(1),
(2), (4) Date: Jun. 10, 2002

(87) PCT Pub. No.: WO02/28755

PCT Pub. Date: Apr. 11, 2002

(65) Prior Publication Data

US 2003/0035920 A1 Feb. 20, 2003

(30) Foreign Application Priority Data

Sep. 29, 2000 (JP) ........................................ 2000-298988

(51) Int. Cl.$^7$ ............................................. B29C 71/04
(52) U.S. Cl. ........................ 264/484; 264/466; 264/467; 156/273.1; 156/274.6
(58) Field of Search ................................ 264/484, 466, 264/467; 425/174.8 R, 174.8 E; 156/273.1, 274.4, 274.6

(56) References Cited

U.S. PATENT DOCUMENTS 3,655,307 A * 4/1972 Hawkins .................... 425/446
3,686,374 A * 8/1972 Hawkins .................... 264/468
3,898,026 A * 8/1975 Sauer et al. ............. 425/174.8 E

FOREIGN PATENT DOCUMENTS

| JP | 51-71351 | 6/1976 |
| JP | 9-202496 | 8/1997 |

* cited by examiner

Primary Examiner—Mark Eashoo
(74) Attorney, Agent, or Firm—Piper Rudnick LLP

(57) ABSTRACT

The present invention provides a film roll comprising an electrified portion at at least part in the transverse direction of a film that is wound into a roll, in which the difference between the maximum width and the minimum width of the electrified portion is 10 mm or less. In this manner, side slipping can be reliably prevented while securing escapeways for air at the edges, and a film roll having no side slips, wrinkles, deformation, decentering, or the like can be manufactured. The film roll of the present invention can be manufactured by intermittently electrifying the film at a predetermined cycle, the ratio of the time duration of the electrification in the cycle being 10 to 80%. The film roll of the present invention has a high adhesive force and does not suffer from slipping during evacuation in a vacuum evaporator. Thus, the film roll is suitable as a master roll for metallization and can be suitably applied to various uses such as magnetic tapes, packaging materials, capacitors, and the like.

17 Claims, 5 Drawing Sheets

FILM ROLL BODY AND METHOD OF MANUFACTURING FILM ROLL BODY

TECHNICAL FIELD

The present invention relates to a film roll made by winding a film for use in magnetic tapes and packaging material, for example, into a roll, and to a method for manufacturing the same.

BACKGROUND ART

Conventionally, when a film is wound into a roll, the surface thereof is treated partially in the transverse direction of the film so as to prevent side slip and snake-like movement of the film. Examples of such surface treatments are embossing, formation of protruding stripe patterns, and electrification. Through these surface treatments, the friction coefficient between film layers can be increased and the adhesion between film layers can be improved, thereby preventing slip and snake-like movement of the film.

Among these surface treatments, an electrification process is disclosed in Japanese Unexamined Patent Application Publication No. 9-202496, for example. Japanese Unexamined Patent Application Publication No. 9-202496 discloses an electrification process for electrifying both surfaces of a film, comprising putting a discharge electrode close to or in contact with one surface of the film while having the other surface in close contact with a portion of a grounded conductive roller so as to charge the film, and then separating the film from the surface of the grounded conductive roller However, in the invention described in Japanese Unexamined Patent Application Publication No. 9-202496, air trapped between film layers while the film is wound into a roll cannot escape through the film edges because the charged portions adhere to each other to prevent slipping during winding, resulting in wrinkles and decentering during rotation.

Especially in a vacuum process such as metallization of a film roll, air trapped between the film layers escapes at once during evacuation process in the vacuum apparatus, resulting in significant slips of the edges and snake-like movement of the film swinging to the left and right while the film is being unwound. Accordingly, a method of electrification of a film roll for metallization in a high vacuum in which high adhesiveness is achieved and air trapped between the film roll layers can adequately escape during winding has been desired.

Japanese Unexamined Patent Application Publication No. 51-71351 discloses a method for securing escapeways for air through edges of the film roll, employing a technology of intermittently imparting surface treatment, such as electrification or hot air, in the longitudinal direction of the film, the surface treatment being synchronized with the rotation of the film roll.

The technology disclosed in Japanese Unexamined Patent Application Publication No. 51-71351 is shown in FIG. 4. As shown in FIG. 4, when a film 4 is wound into a film roll 1, the film 4 is intermittently charged with a needle electrode 7 connected to a high voltage power supply 9. Moreover, the speed of rotation of the film roll 1 is detected with a rotation-speed detector 15 for the film roll 1 so as to control on/off of the high voltage output to synchronize with the rotation of the roll using a controller 12.

In this method, however, because the surface treatment by electrification is synchronous with the rotation of the winding roll, a complex and expensive controller 12 is required. Moreover, especially since the application cycle of the high voltage is varied in response to an increase in the rolled diameter of the film roll, switching of a high-voltage circuit is required. Since this system is complex, there is a problem in that the high-voltage switching section is vulnerable to damage.

Furthermore, because a voltage is intermittently applied to the needle electrode 7, adhesion and solidification of dust on the needle electrode and oxidation of the needle tip are significant, requiring extensive maintenance. Also, the needle tip changes shape due to corrosion, resulting in variation in discharge state over time and, eventually, in control failure.

Since each film layer adheres to the next at a particular position in the perimeter direction of the film roll, a difference in air distribution is generated in the perimeter direction when the rolled diameter is large, resulting in degraded roll quality. To be more specific, as shown in FIG. 4, a difference in the film roll hardness between a film adhesive portion 16 and a nonadhesive portion 17 is generated, resulting in a polygonal roll which causes tensile variation, film breakages, and wrinkles.

In the above known electrification process, the electrification process is performed in uneven manner, and when the film is wound into a film roll, the electrified portions are sequentially stacked at the same position of the film roll. Thus, the electric potential of this position significantly increases, and, as shown in FIG. 8, a discharge 22 occurs from the electrified portion to the neighboring nonelectrified portion, resulting in changes in the width of the electrified portion.

In view of the above, the known surface technology is not sufficient for preventing slipping of the film roll during winding.

SUMMARY OF THE INVENTION

A film roll of the present invention comprises an electrified portion at at least part in the transverse direction of a film that is wound into a roll, the difference between the maximum width and the minimum width of the electrified portion being 10 mm or less.

The film roll of the present invention preferably has a plurality of electrified portions intermittently present in the longitudinal direction of the film at a predetermined cycle. The ratio of the plurality of electrified portions in the cycle is preferably 10 to 80% in the longitudinal direction of the film, and the width of the electrified portion is preferably 20 mm or less.

A method for manufacturing a film roll of the present invention comprises intermittently electrifying a film in the longitudinal direction of the film at a predetermined cycle. The duration of electrification is 10 to 80% of the cycle.

Figure 1:
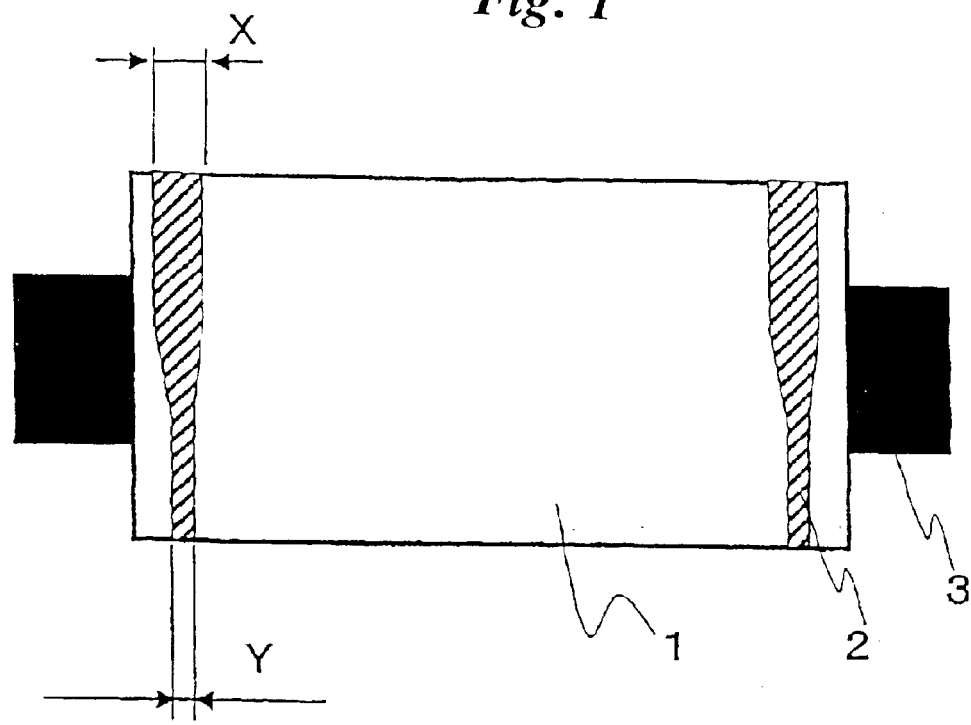
FIG. 1 is a front view showing an embodiment of a film roll of the present invention.

Reference Numerals 1. film roll
2. electrified portion
3. winding roller
4. film
5. guide roller
6. ring discharge electrode
7. needle discharge electrode
8. gear-type ring electrode
9. high voltage power supply
10. high voltage amplifier
11. pulse waveform generator
12. controller
13. direct-current high voltage power supply
14. contact roller
15. rotation speed detector for film roll
16. adhesive portion of the film
17. nonadhesive portion of the film
18. die
19. solidification drum
20. master roll
21. slitting blade
22. discharge mark
23. shaft bearing
24. conductive rubber layer
25. side coating
A, A' film supplying mechanism
B, B' transfer section
S cycle of the electrified portion
E length of the electrified portion
X maximum width of the electrified portion
Y minimum width of the electrified portion

BEST MODE FOR CARRYING OUT THE INVENTION

The principle of the present invention and the preferred embodiments will now be described with reference to the drawings.

The film roll of the present invention has an electrified portion at least part of the film in the transverse direction. The difference between the maximum width and the minimum width of the electrified portion is 10 mm or less.

At a difference between the maximum and minimum widths of the electrified portion exceeding 10 mm, reliable slip prevention and escaping of air through the edges cannot be achieved simultaneously. At a difference between the maximum and minimum widths of the electrified portion of 10 mm or less, the side slip of the film roll can be effectively prevented, and decentering, wrinkles, and deformation of the roll can be avoided.

Figure 2:
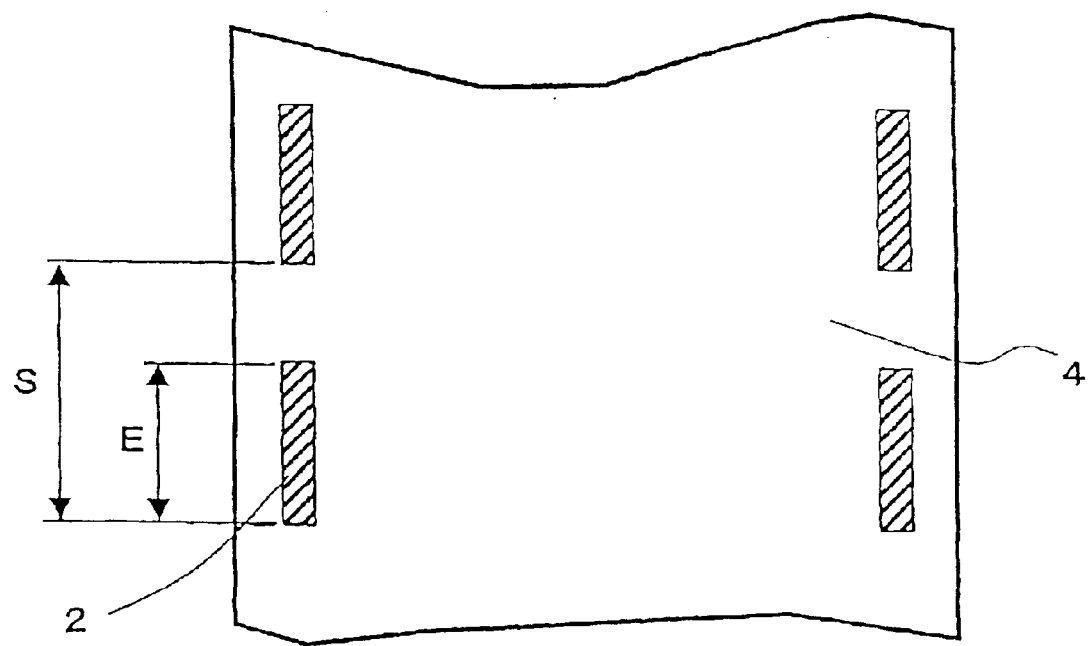
FIG. 2 is a schematic view of a film showing an embodiment of a film of the present invention.

An embodiment of a film roll of the present invention is shown in FIG. 1 and an embodiment of a film of the present invention is shown in FIG. 2. An electrified portion 2 of a film roll 1 is provided to prevent slipping. The difference between the maximum width Y and the minimum width X of the electrified portion 2 is 10 mm or less. Here, the term width of the electrified portion refers to the length of the electrified portion in a direction orthogonal to the longitudinal direction of the film. When the length of the electrified portion is 1 m or more, the width of the electrified portion is examined across any 1-meter length in the longitudinal direction of the film, and the maximum width in that 1-meter length is defined as Y and the minimum width is defined as X to determine the difference therebetween. When the length of the electrified portion is less than 1 m, the maximum and minimum widths across the electrified portion corresponding to one cycle are measured to determine the difference therebetween.

The width and the condition of the electrified portion can be visually observed by sprinkling powder or liquid which adheres to the electrified portion, such as toners used in printing and copying machines.

The portion that is strongly electrified by the electrification process can be clearly observed by vision by placing the film on a conductive plate and sprinkling a toner or talcum powder thereon.

When the toner adheres to a portion other than the electrified portion, the border between the electrified portion and the nonelectrified portion can be distinguished by the amount of the toner adhered thereon. The maximum width, the minimum width, and the cycle in the longitudinal direction of the electrified portion can be measured using this border as the marker.

In the present invention, a plurality of electrified portions are preferably provided intermittently in the longitudinal direction of the film at a predetermined cycle.

In the present invention, the ratio of the electrified portion is preferably 10 to 80% of one cycle in the longitudinal direction.

As shown in FIG. 2, the ratio of the electrified portion 2 in a film 4 corresponding to one cycle is determined by dividing the length E of the electrified portion by the length of the cycle S. During the film winding, the electrification is intermittently performed at a predetermined cycle, and the time duration of electrification is controlled to 10 to 80% of the cycle, so as to yield a ratio of the electrified portion in the film roll of 10 to 80% in the longitudinal direction.

If the length E of one cycle is smaller than the perimeter of the film roll and the total length of the film is sufficiently larger than the cycle, the probability at which the electrified portions of adjacent layers are stacked on one another, averaged out for the entirety of the film roll, is approximately the same as the ratio occupied by the electrified portion in one cycle, which is approximately 10 to 80% in the rolling direction.

At a ratio of the electrified portion of less than 10%, the electrified portions do not overlap each other sufficiently, thereby failing to provide the initially intended effect of preventing slipping. In contrast, when the ratio of the electrified portion exceeds 80%, the most of electrified portion are stacked, and although slipping can be prevented, degradation in roll quality occurs due to trapped air, and undesired discharge may occur at nonelectrified portions due to these stacked electrified portions.

In the present invention, the ratio of the electrified portion is, more preferably, 40 to 60% of the cycle in the longitudinal direction, and, most preferably, 50%. At a ratio of the electrified portion of 40 to 60% of the cycle, the effect of air escape most desirably balances with the effect of slip prevention.

When a film having a relatively large friction coefficient between film layers is used, the cycle of electrification may be made larger than the roll perimeter of the innermost layer so that each film layer does not include more than one electrified portion. This is because if electrified films are provided one on the top of the other, an attractive force works at a strength inversely proportional to a distance therebetween squared, even if they are a few layers apart. When the cycle of the electrification is made larger than the roll perimeter of the innermost layer, the cycle of the electrification is preferably 1 to 20 times the roll perimeter of the innermost layer and the ratio occupied by the electrified portion in one cycle is preferably 10 to 60%.

In the present invention, no limit is imposed as to the electrified portion as long as the electrified portion is provided at least at one position in the transverse direction of the film. But when metal is deposited or applied on the film surface in the following step, the metal does not uniformly bond with the film if the film surface subjected to deposition and application is strongly electrified by electrification. Thus, electrification is preferably effected only to the edge portions so as not to cause obstruction in the following step.

When the width of the film roll is large, the film readily slips due to an increased amount of trapped air; accordingly, electrification is preferably performed at 2 or more positions in the transverse direction, such as both edges.

In the present invention, the film includes any polymer film such as a thermoplastic film or the like. The thermoplastic film is particularly preferable.

In the present invention, the film is preferably one capable of readily retaining electric charges in which the supplied electric charges do not become scattered and lost in a short time (during the time taken from the supply of the electric charges to the completion of winding), and is, more preferably, insulative.

The present invention can be suitably applied to a film having high air-barrier property.

In the present invention, examples of preferred films are films of polyesters such as polyethylene terephthalate, polyethylene-2,6-naphthalate, or the like, films of polyolefins such as polyethylene, polypropylene, or the like, films of polyvinyls such as polyvinyl chloride, polyvinylidene chloride, or the like, and films of polyamides, aromatic polyamides, polyphenylene sulfide, or the like. A polypropylene film and a polyethylene terephthalate film are particularly suitable.

The film roll of the present invention can be applied to not only thermoplastic resin films but also polymer films which are dissolved in a solvent.

The film roll of the present invention can be suitably applied to an untreated film used in metallization or the like. The invention can be applied to films for magnetic tapes, capacitors, packaging materials, or the like, and films used in a circuit board. The invention can also be applied to a film subjected to a secondary processing such as an application or printing process of a magnetic coating or the like, a metallization process, a laminating process with a different type of a film, or the like.

The film roll of the present invention may generally use a 0.2 to 0.5 mm thick film, a 10 to 30 μm film, and 1 to 3 μm ultra-thin film. However, no limit is imposed as to the thickness of the film.

The film roll of the present invention is suitable for a wide range of uses such as magnetic tapes, packaging materials, capacitors, and the like. For use of a magnetic tape or capacitor, a thin film is used. The film roll of the present invention can be suitably used for a packaging material, and especially for a film for packaging food such as confectioneries that requires protection from air and moisture.

Figure 3:
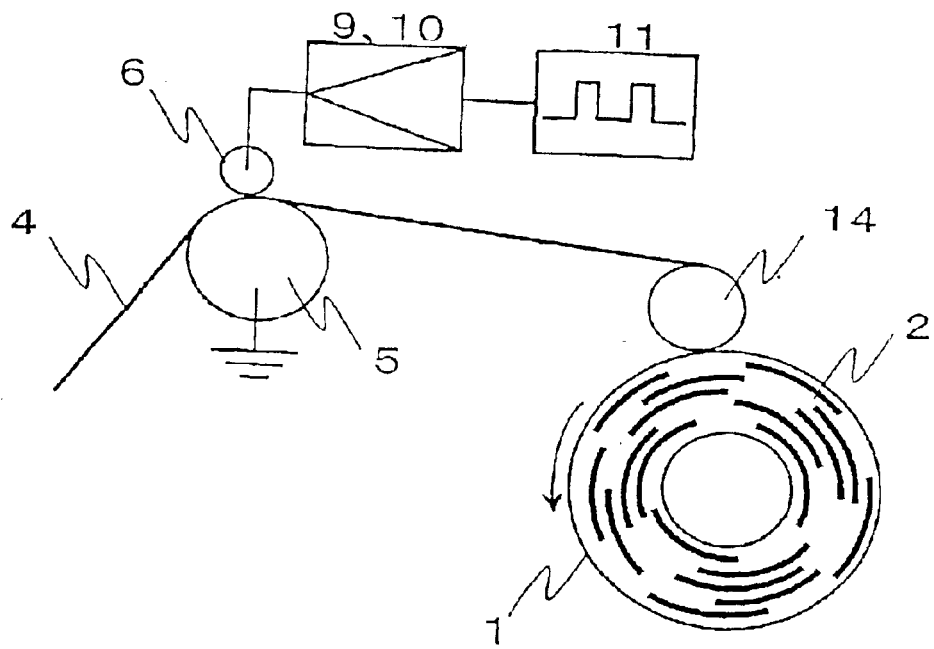
FIG. 3 is a block diagram showing an exemplary method for manufacturing the film roll of the present invention.

An example of a method for manufacturing the film roll of the present invention is shown in FIG. 3.

The film 4 is transferred from the left to the right by a plurality of guide rollers 5 comprising metal rollers and is wound into a film roll. In the drawing, the film is sandwiched between the guide roller and a discharge electrode 6 (a ring-shaped roller functioning as a ring discharge electrode) disposed as a nip roller, and is subjected to electrification.

The ring discharge electrode 6 is connected to a high-voltage power supply 9, and the guide rollers such as conductive rollers are usually grounded.

In the method for manufacturing the film roll of the present invention, a ring electrode is preferably used as a discharge electrode during cyclic application of the voltage. Whereas a needle electrode is drastically corroded by cyclic changes in electrical fields, a ring electrode has a small electrical-field focus and scarcely deteriorates by cyclic changes in the electrical field.

In the method for manufacturing the film roll of the present invention, no limit is imposed as to the dimensions of the ring electrode, as long as the electrode is capable of reliably electrifying the film. However, since excessively large dimensions result in difficulty in securing a clearance for the discharge gap, the ring diameter is preferably approximately 50 to 200 mm. The ring width of the ring electrode is preferably approximately 5 to 50 mm, and more preferably, 10 to 20 mm, in order to minimize the electrified portion as much as possible. This is because a width of 20 mm is sufficient for preventing slipping and the ring can be easily formed at a width of 10 mm or more.

Moreover, the ring electrode is preferably subjected to processing to provide the ring side surface with a curvature so as to prevent sparks passing from the side face of the electrode to the film surface.

Moreover, in the method for manufacturing the film roll of the present invention, in order to prevent an excessively large electric current to flow due to contacting metal rolls in the event of film breakage, the surface of the ring electrode is preferably provided with a conductive rubber. More preferably, the surface of the ring electrode is covered with a conductive rubber. When the surface of the ring electrode is covered with a conductive rubber, the width of the ring electrode can be made the same as the width of the electrified portion, and reliable electrification can be performed. Thus, the width of the electrified portion can be minimized, and the variation in the width can be decreased.

The layer of the conductive rubber preferably has a resistance of $10^4$ to $10^8$ Ωcm and a thickness of approximately 1 to 10 mm.

Figure 9:
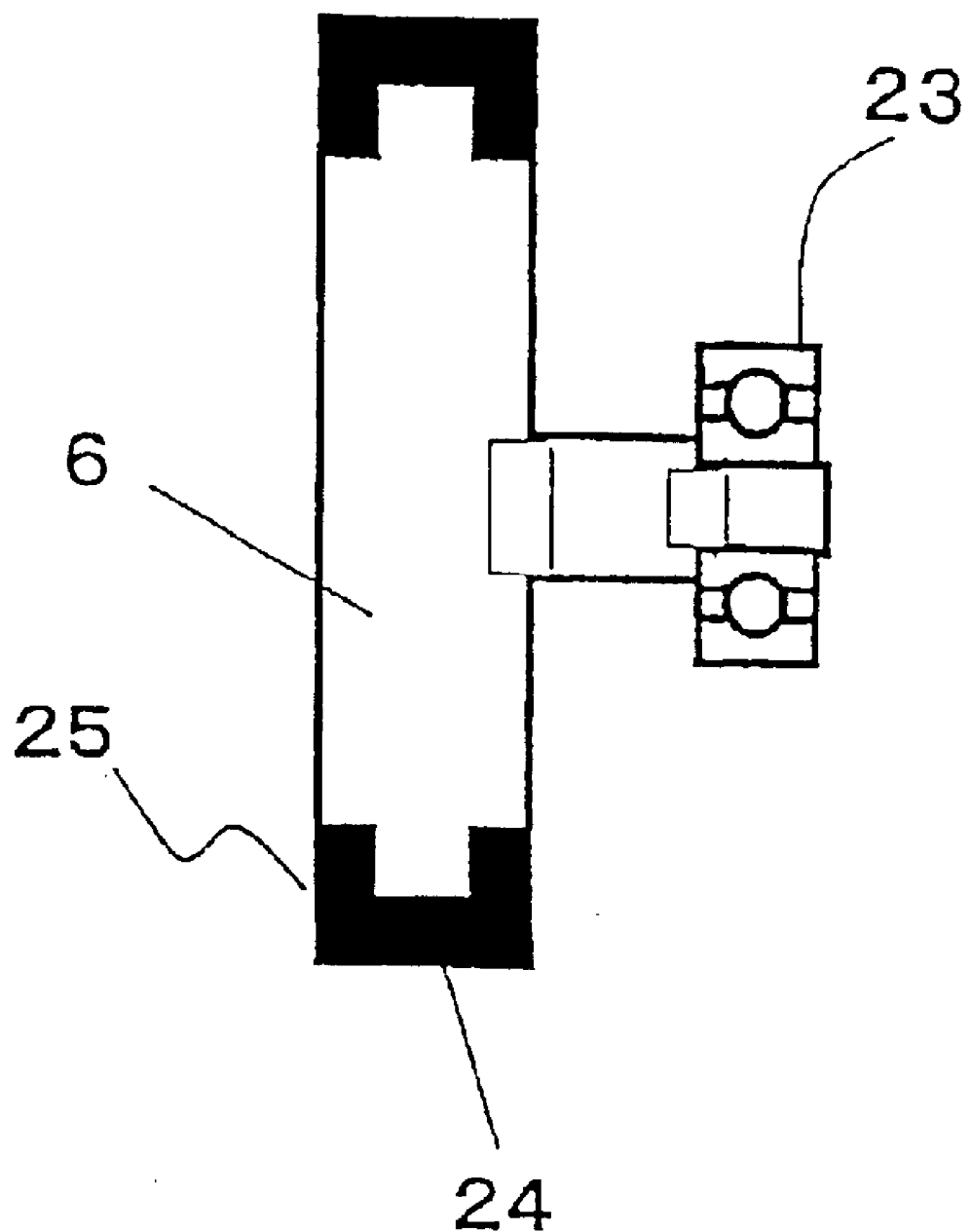
FIG. 9 is a cross-sectional view showing an example of a ring electrode used in the method for manufacturing the film roll of the present invention.

As shown in FIG. 9, at least part of the side face of the ring electrode 6 is preferably covered with an insulator (a side coating 25) having an electrical resistance equal to or more than that of the conductive rubber. This is to prevent undesired discharge from the metal portion at the side face of the electrode to the film. As a result, variation in the width of the electrified portion can be further decreased.

Furthermore, in the method for manufacturing the film roll of the present invention, a circuit for shielding an excessively large electric current may be provided to prevent an excessively large electric current to flow due to contacting metal rollers in the event of film breakage.

In the method for manufacturing the film roll of the present invention, an electrification process is performed at a predetermined cycle. In this invention, "predetermined cycle" means that the electrification is performed or ceased at a predetermined cycle. The same cycle may be used for the entire length of the film roll, or the cycle may be gradually changed corresponding to the roll diameter. However, the electrification is preferably performed at a constant cycle throughout the entire length of the film roll because the configuration of the power supply can be simplified to reliably withstand long-term use.

At a constant cycle of electrification, the electrified portion 2, for example, is naturally shifted in the perimeter direction because the perimeter of the film roll increases as the roll diameter of the film roll changes as shown in FIG. 3. As a result, the electrified portions are arranged at random relative to the perimeter direction of the film roll. When the electrified portions of the film roll are randomly arranged, portions which readily allow air to escape and portions which do not readily allow air to escape are scattered to prevent local deformation of the film roll. The resulting film roll 1 has uniform edges and is free of wrinkles and decentering, thereby preventing snake-like movement and film breakage during the following step of unwinding.

Figure 8:
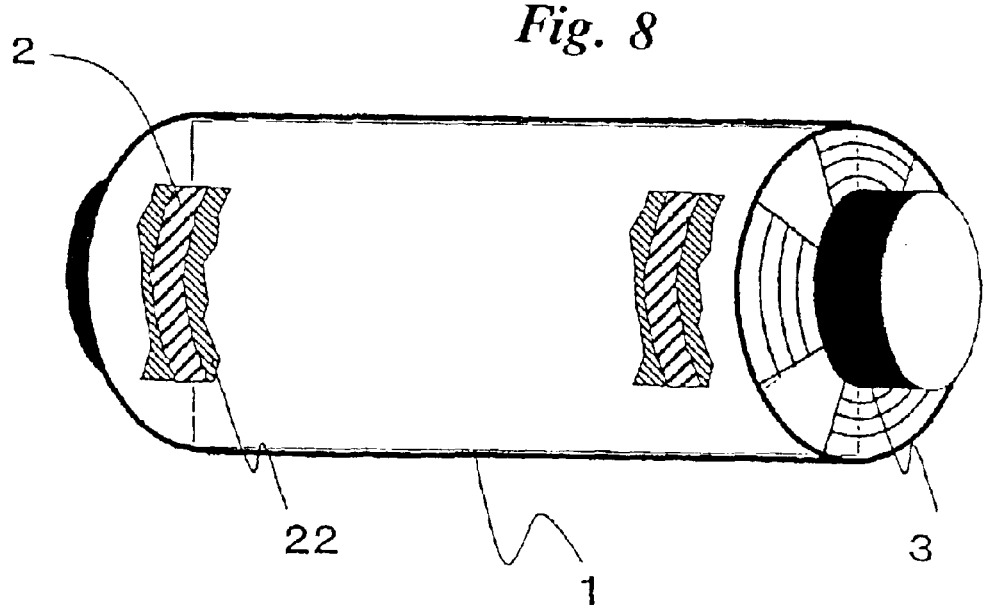
FIG. 8 is a perspective view of a film roll manufactured by a known electrification process.

Moreover, at a constant cycle of electrification, since the electrified portions are not stacked at the same position on the film roll, excessive electrification can be prevented. As a result, discharge marks 22 onto the nonelectrified portions shown in FIG. 8 can be prevented.

In the method for manufacturing the film roll of the present invention, a signal generated by a pulse generator 11 shown in FIG. 3 is preferably input to a high voltage amplifier 10 in order to perform electrification of the film 4 at a constant cycle.

In the method for manufacturing the film roll of the present invention, the preferred application cycle of electrification is in the range of 0.05 to 1.5 (m). At a cycle of less than 0.05, the gaps for air to escape are small. At a cycle exceeding 1.5, the probability of the electrified portions stacked on each other being 10 to 80% tends to be less than 1.

Figure 5:
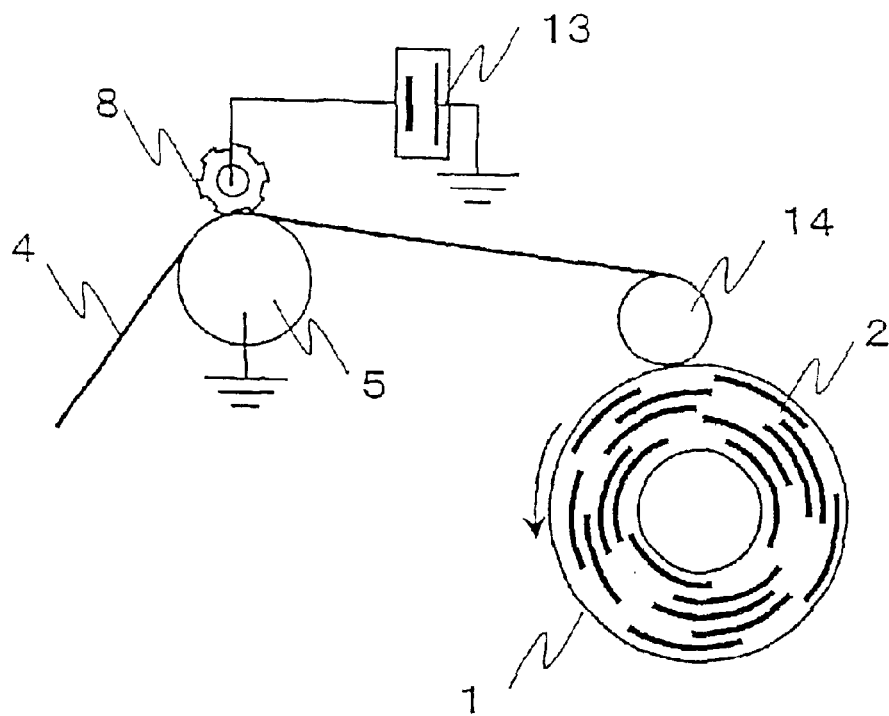
FIG. 5 is a block diagram showing another exemplary method for manufacturing a film roll of the present invention, which is different from that shown in FIG. 3.

In the method for manufacturing the film roll of the present invention, as shown in FIG. 5, a gear-shaped ring electrode 8 may be used as the discharge electrode for intermittently applying voltage at a constant cycle. The gear-shaped ring electrode 8 preferably has projecting teeth at a constant pitch arranged in the perimeter direction, and the height of each tooth is preferably sufficiently larger than the discharge gap. In such a case, a direct-current high voltage power supply 13 can be used as the means for applying voltage for electrification.

In the method for manufacturing the film roll of the present invention, the voltage capable of electrifying the film refers to a voltage sufficiently higher than the break-down voltage defined by the film thickness $\delta$ and the relative dielectric constant $\epsilon_r$. As for the value of the voltage, when a ring electrode such as that shown in FIG. 3 is used, the value is preferably approximately 2 to 10 times the break-down voltage. It should be noted that the break-down voltage can be theoretically determined from the two formulae below:

a formula for obtaining a voltage $V_g$ applied to a gap (discharge gap) between the ring electrode and the film:

$$V_g = (V_a - V_c) Z / (\delta/\epsilon_r + Z) \tag{1}$$

wherein $V_a$ is an applied voltage, $V_c$ is an electrification potential at the film surface, and Z is the discharge gap; and a primary approximate formula according to Paschen's law regarding a break-down voltage $V_b$ at the gap:

$$V_b = 312 + 6.2Z \tag{2}$$

The break-down voltage is the value $V_a - V_c$ when $V_g = V_b$. Ignoring the effect of the electrification potential of the film, the applied voltage can be calculated from the formula below:

$$V_a = 312 + 6.2\delta/\epsilon_r + 88\sqrt{(\delta/\epsilon_r)} \tag{3}$$

When the electrification is performed in cycles, the voltage and the electric current during discharge are preferably constant and the voltage is preferably set at a voltage 2 to 10 times the break-down voltage to avoid a danger of unstable discharge due to decrease in voltage caused by voltage control.

In order to achieve stable discharge, the ring electrode is preferably pressed onto an antipole, such as a grounded conductive roller, with a predetermined force. In this manner, the discharge gap naturally present.

In the method for manufacturing the film roll of the present invention, in intermittently performing electrification, a rectangular wave voltage having one polarity, i.e., either positive or negative, is preferably applied so as to prevent the two contacting surfaces of the stacked film from having the same polarity. The waveform of the rectangular wave voltage need only be approximately rectangular and may be trapezoidal having sloped rising and falling edges or of a shape obtained by half-wave rectification of a sine wave. However, the rectangular wave is preferred because it can be output easily and the on/off ratio of the voltage can be readily controlled.

In the method for manufacturing the film roll of the present invention, both surfaces of the film are preferably electrified to have reversed polarities to each other. When both surfaces of the film are electrified, the adjacent film layers in the resulting film roll securely adhere to one another at the electrified portions.

As for a film having a conductive layer at one surface, such as a metallized film, electrification, if necessary, needs to be performed at an insulating surface only. That is, when a film having a conductive layer at one surface is wound into a film roll, electric charges are induced by the electrostatic induction onto the conductive layer in contact with the electrified portion, thereby generating an adhesive force.

As shown in FIG. 3, both surfaces of a film free of conductive layers can be readily electrified by electrifying the film on a conductor having low potential such as a grounded conductor and then stripping the film from the conductor. Because of the electric charges on the film surface supplied on the conductor, discharging takes place between the conductor and the rear side of the film when it is stripped, thereby automatically supplying electrical charges of reversed polarities to two surfaces of the film.

In the method for manufacturing the film roll of the present invention, the conductive roller is preferably a metal roller including a shaft composed of steel or aluminum and a surface either plated, coated with a conductive material, or formed of a metal material. In this case, for safety reasons and for the purpose of applying a voltage to the conductive roller from the ring discharge electrode, the conductive roller is preferably grounded.

Figure 6:
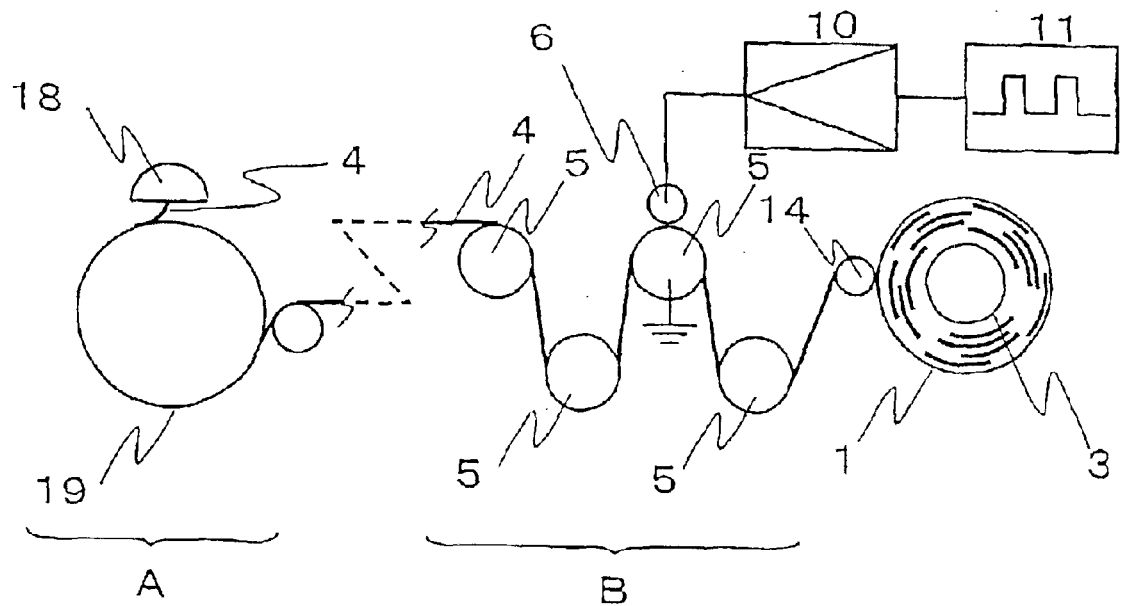
FIG. 6 is a block diagram showing yet another exemplary method for manufacturing a film roll of the present invention, which is different from those shown in FIGS. 3 and 5.
Figure 7:
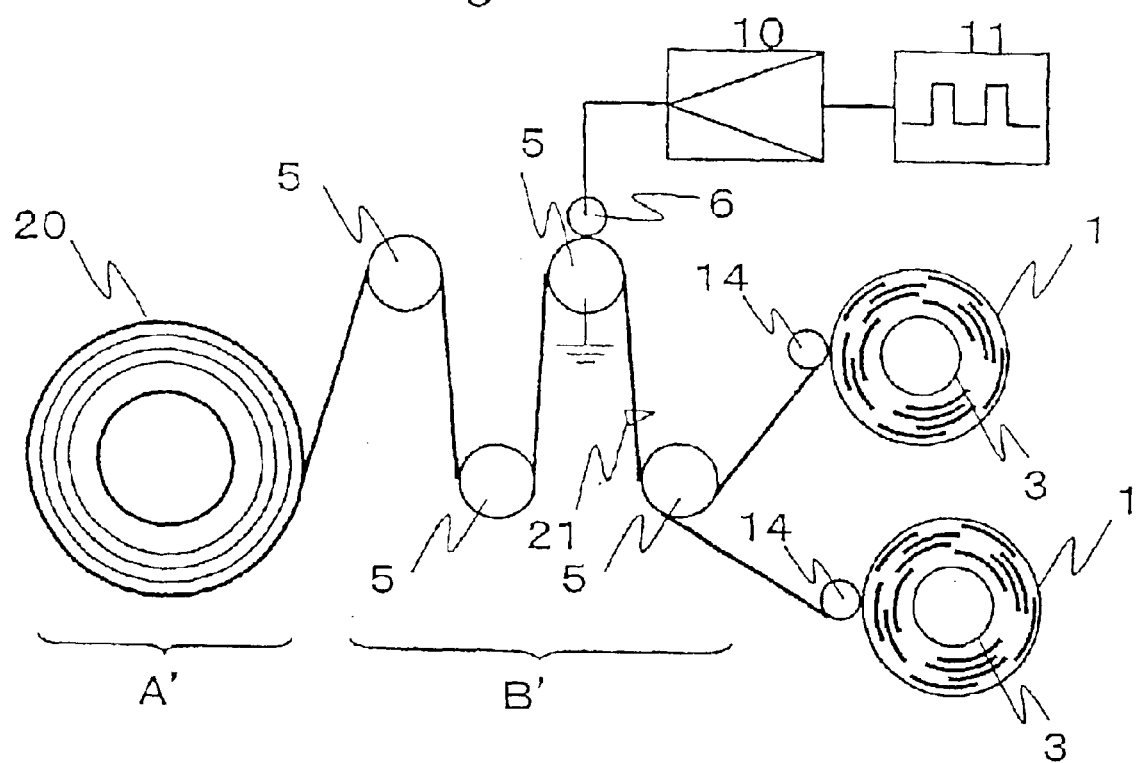
FIG. 7 is a block diagram showing still another exemplary method for manufacturing a film roll of the present invention, which is different from those shown in FIGS. 3, 5, and 6.

In the method for manufacturing the film roll of the present invention, the film is supplied, for example, from a die as shown FIG. 6 or from a film unwinder for a master roll used in a slitter as shown in FIG. 7.

Exemplary film-winding mechanisms which can be employed in the manufacturing method of the film roll of the present invention are shown in FIGS. 6 and 7. The film roll of the present invention is wound by driving the contact rollers or the winding rollers with a motor. FIG. 7 is configured from a film supplying mechanism A' comprising a master roll and a transfer section B' comprising guide rollers.

As described above, the present inventors succeeded in obtaining a film roll having an electrified portion with an unvarying small width by thoroughly examining the method for making the film roll. The resulting film roll has a variation in width of the electrified portion of 10 mm or less. The width of the electrified portion is preferably 20 mm or less. In this manner, undesired electrification of the portion processed in the following step can be avoided, and slipping and wrinkles can be prevented.

Moreover, the rolled film according to the present invention has a high adhesive force; hence no slipping occurs during evacuation in a vacuum evaporator. Thus, the film roll of the present invention is particularly suitable as a master roll for metallization.

Next, the present invention is specifically described by way of examples. Evaluation methods employed for the Examples and Comparative Examples are as follows. A polypropylene film or a polyester film was used as the film.

(1) Electrification

The electrified portion was visualized using a toner. The width of the electrified portion was then determined and evaluated according to the criteria below. The width was measured with a ruler.

Width of the electrified portion

Excellent: 15 mm or less, Average: larger than 15 mm but not more than 20 mm, Poor: larger than 20 mm.

The difference between the maximum width and the minimum width

Excellent: 10 mm or less, Poor: larger than 10 mm (2) Roll quality

The amount of side slip was measured and evaluated according to the criteria below.

Side slip

Excellent: 0.5 mm or less, Average: more than 0.5 mm but not more than 2 mm, Poor: more than 2 mm The quality of the film roll was evaluated from two aspects, i.e., the extent of wrinkles and the extent of decentering.

Extent of wrinkles

Excellent, Average, Poor: below the product standard.

Extent of decentering

Excellent, Average: significant tension variation, Poor: film breakage resulted from decentering.

(3) Amount of slipping in a vacuum apparatus

The film roll was placed in a vacuum apparatus to simulate the slipping of the master roll in the vacuum evaporator. Slipping caused by evacuation was observed and was evaluated according to the same criteria as those used in side slip.

EXAMPLE 1

A polypropylene film having a width of 2 m and a thickness of 29 μm was wound by the method illustrated in FIG. 3 at a film speed of 85 m/min up to a length of 4,500 m. Using a ring electrode having the shape illustrated in FIG. 9, a diameter of 100 mm, a width of 10 mm covered with conductive chloroprene having a thickness of 2 mm and an electrical resistivity of $2 \times 10^6$ ΩCm, electrification was intermittently performed at a time duration of voltage application of 50% to electrify the film at a current of −0.22 mA (applied voltage of −3.5 kV) and 10 Hz (a cycle of 0.1 seconds). The results are shown in Table 1.

As indicated in Table 1, the electrified portion of the resulting film roll was stable, i.e., 10 to 11 mm (the difference between the maximum and minimum widths being 1 mm), and no side slip during winding or slipping in the vacuum apparatus was observed due to a strong adhesive force.

Since the ratio of the electrified portion in the film roll was 50%, air was able to escape from the edges, no wrinkles were observed, and decentering was approximately 0.1 mm, thereby minimizing the tension variation. The resulting film roll was ideal as a master roll for metallization.

COMPARATIVE EXAMPLE 1

Figure 4:
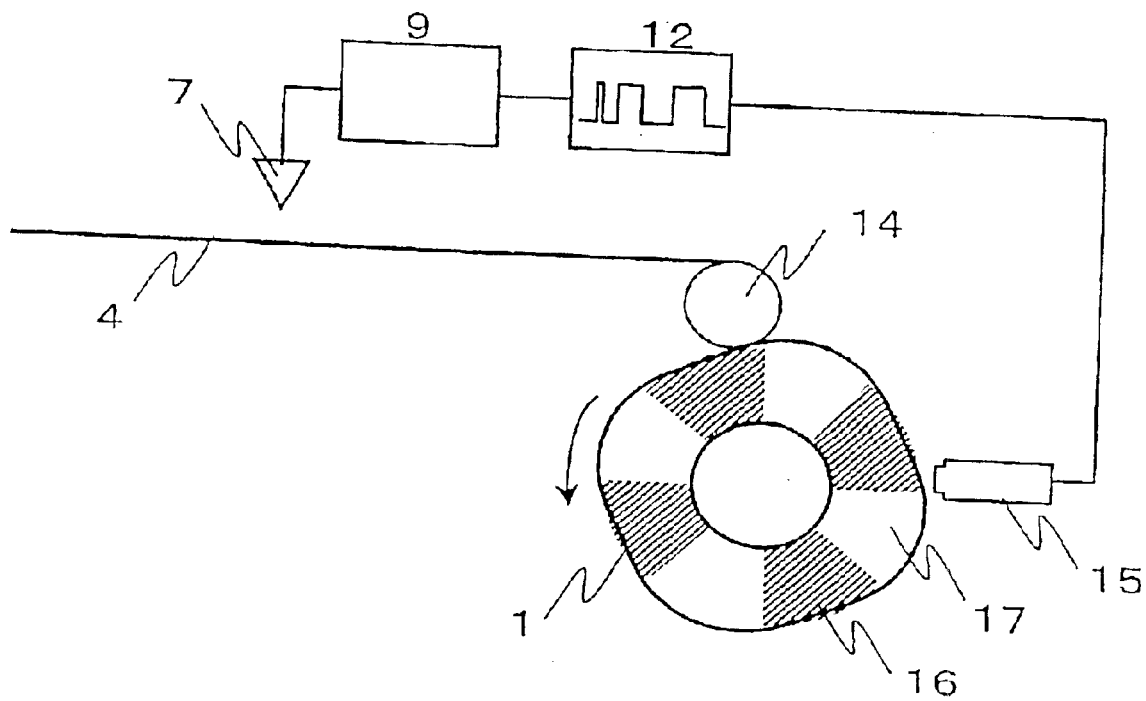
FIG. 4 is a block diagram showing a known method for manufacturing a film roll.

As in Example 1, a polypropylene film having a width of 2 m and a thickness of 29 μm was wound by the method illustrated in FIG. 4 at a film speed of 85 m/min up to a length of 4,500 m. Needle electrodes were placed at two edges, a voltage of 7 kV was applied to each needle electrode, and electrification was intermittently performed to be synchronous with the rotation so that the length of the electrified portion was equal with the length of the nonelectrified portion relative to four positions per rotation of the film roll. The results are shown in Table 1.

The current value of the needle electrode was unstable. As a result, the difference between the maximum and minimum widths of the electrified portion exceeded 10 mm, i.e., was approximately 15 mm. Although the width of the electrified portion was initially set to 10 mm, the width of the electrified portion exceeded 20 mm in some positions, rendering a reduced area for metallization. Moreover, since discharge from the needle electrode was unstable and some positions were only weakly electrified, slipping occurred exceeding as much as 30 mm at the outer layers during evacuation in the metallization process.

Air trapped between film layers properly escaped, and no wrinkles were observed. However, since the electrification was synchronous with the rotation, a tensile variation due to decentering was observed when compared with Example 1.

TABLE 1

|  | Voltage | Current | Slipping due to Evacuation | Side Slip | Width of Electrified Portion | Width Variation | Wrinkles | Decentering |
| --- | --- | --- | --- | --- | --- | --- | --- | --- |
| Example 1 | −3.5 | −0.22 | Excellent | Excellent | Excellent | Excellent | Excellent | Excellent |
| Comparative Example 1 | −7.0 | −0.10 | Poor | Excellent | Poor | Poor | Excellent | Average |

TABLE 1-continued

|  | Voltage | Current | Slipping due to Evacuation | Side Slip | Width of Electrified Portion | Width Variation | Wrinkles | Decentering |
|---|---|---|---|---|---|---|---|---|
| Example 3 | −2.0 | −0.1 | Not performed | Excellent | Excellent | Excellent | Excellent | Excellent |
| Comparative Example 3 | −10.0 | −0.05 | Not performed | Excellent | Poor | Poor | Poor | Average |

EXAMPLE 2

Films were manufactured continuously, except when the apparatus was stopped, by the method described in Example 1. After a year of operation, no significant damage was visually observed on the electrode roll. No significant variations were observed in the applied voltage and current of the ring discharge electrode. Moreover, the conditions of the electrified portions of the film roll and the roll quality, were no big change and were good.

COMPARATIVE EXAMPLE 2

As in Example 2, films were manufactured continuously, except when the apparatus was stopped, by the method described in Comparative Example 1. The current value of the needle electrode was unstable, and, as a result, the difference between the maximum and minimum widths of the electrified portion exceeded 10 mm, i.e., it was approximately 20 mm. Because of dust deposition on the electrode, weekly cleaning was necessary, the tip of the electrode corroded so much that it could be observed with the naked eye after three months of operation, and the difference between the maximum and minimum widths of the electrified portions further increased, requiring replacement of the electrode. After the replacement, the same needle electrode was used for 6 months, but again suffered from extensive corrosion to the extent as the needle before the replacement. The voltage needed to be elevated to 1.5 times the initial voltage in order to obtain the same side-slip-prevention effect. Due to switching at high voltages, the contact points deteriorated, the power supply generated abnormal sound, and maintenance was necessary.

EXAMPLE 3

A stretched polyester film having a width of 3.5 m and a thickness of 10 μm was wound by the method described in Example 1 at a film speed of 200 m/min up to a length of 90,000 m. The current flowing in the electrode during electrification was −0.1 mA (applied voltage being −2.0 kV). Electrification was intermittently performed at 50 Hz (a cycle of 0.02 seconds) and the duration of the voltage application was 60%.

Since the roll diameter was large, evaluation relating to the vacuum apparatus was not conducted. Evaluations on other items demonstrated satisfactory results as in Example 1.

COMPARATIVE EXAMPLE 3

A stretched polyester film having a width of 3.5 m and a thickness of 10 μm was wound by the method described in Comparative Example 1 at a film speed of 200 m/min up to a length of 90,000 m. Needle electrodes were placed at two edges, a voltage of 10 kV was applied to each needle electrode, and electrification was intermittently performed to be synchronous with the rotation so that the length of the electrified portion was equal with the length of the nonelectrified portion relative to four positions per rotation of the film roll.

As shown in Table 1, although the current value was controlled to minimize the side slip, the voltage needed to be elevated to 10 kV. The width of the electrified portion exceeded 30 mm, and the difference between the maximum and minimum widths was approximately 20 mm, exceeding 10 mm. Since the roll diameter was large, decentering was significant, resulting in a significant tensile variation and generation of wrinkles, although no film breakages were observed.

Industrial Applicability

According to the present invention, the film roll has an electrified portion at at least part in the transverse direction of a film that is wound into a roll, the difference between the maximum width and the minimum width of the electrified portion being 10 mm or less. In this manner, side slipping can be reliably prevented while securing escapeways for air at the edges, and a film roll having no side slips, wrinkles, deformation, decentering, or the like can be manufactured.

Moreover, the ratio of the electrified portions made by intermittently electrifying the film at a predetermined cycle is 10 to 80%, and the width of the electrified portion is preferably 20 mm or less. In this manner, side slips can be prevented, and wrinkles and slipping of the rolled film can be prevented while avoiding unnecessary electrification to a portion subjected to the subsequent process such as metallization.

The film roll of the present invention can be manufactured by intermittent electrification. For example, a ring electrode, which suffers less from corrosion and exhibits long-term stability, can be used in an electrification process to achieve ease in maintenance. Through such a process, a film roll having no side slips, wrinkles, decentering, and deformation can be manufactured.

The film roll of the invention exhibits a strong adhesive force and is free from slipping during evacuation in a vacuum evaporator. Thus, the film roll is suitable for a master roll for metallization and can be applied to various uses such as magnetic tapes, packaging materials, capacitors, and the like.

What is claimed is:

1. A method for manufacturing a film rail comprising:
   providing a film:
   intermittently electrifying a film in a longitudinal direction of the film with a ring electrode while the electrode is contacting the film such that the electrified portion of each layer of the film is shifted in the perimeter direction as the roll diameter of the film roll changes:
   end
   winding the film into a roll.

2. The method according to claim 1, wherein the film is a thermoplastic film.

3. The method according to claim 1, wherein the film is an insulative film.

4. The method according to claim 1, wherein the film is a polypropylene film or a polyethylene terephthalate film.

5. The method according to claim 1, wherein the film is a master roll for metallization.

6. The method according to claim 1, wherein the film is a packaging film.

7. The method for manufacturing a film roll according to claim 1, wherein electrification is performed at a predetermined cycle.

8. The method for manufacturing a film roll according to claim 7, wherein the time duration of electrification is 10 to 80% of one cycle.

9. The method for manufacturing a film roll according to claim 7, wherein the cycle of electrification is constant.

10. The method for manufacturing a film roll according to claim 7, wherein the time duration of the electrification is 40 to 60% of one cycle.

11. The method for manufacturing a film roll according to claim 7, wherein the cycle of the electrification is 1 to 20 times the perimeter of an innermost layer of the film roll, and the ratio of an electrified portion occupying the cycle is 10 to 50%.

12. The method for manufacturing a film roll according to claim 7, wherein the cycle of the electrification is 0.05 to 1.5 m.

13. The method for manufacturing a film roll according to claim 7, wherein the cycle of electrification gradually varies as the roll diameter of the film roll changes.

14. The method for manufacturing a film roll according to claim 1, wherein a conductive rubber is provided on the surface of the ring electrode that is contacting the film with the conductive rubber.

15. The method for manufacturing a film roll according to claim 14, wherein at least part of a side face of the ring electrode is covered with the conductive rubber or a material having a resistance equal to or more than that of the conductive rubber.

16. The method for manufacturing a film roll according to claim 1, wherein the electrification is performed while the file is sandwiched between the ring electrode and a conductive roller.

17. The method for manufacturing a film roll according to claim 1, wherein an applied voltage is 2 to 10 times a voltage $V_a$ determined by the formula below:

$$V_a = 312 + 6.2\delta/\epsilon_r + 88\sqrt{(\delta/\epsilon_r)}$$

wherein $\delta$ is the film thickness ($\mu$m) and $\epsilon_r$ is the relative dielectric constant of the film.

* * * * *

UNITED STATES PATENT AND TRADEMARK OFFICE
CERTIFICATE OF CORRECTION

PATENT NO. : 6,838,039 B2
DATED : January 4, 2005
INVENTOR(S) : Morioka et al.

It is certified that error appears in the above-identified patent and that said Letters Patent is hereby corrected as shown below:

<u>Column 12,</u>
Line 55, please change "rail" to -- roll --.

<u>Column 14,</u>
Line 11, please change "resistance" to -- resistivity --; and
Line 15, please change "file" to -- film --.

Signed and Sealed this

Twenty-fourth Day of May, 2005

JON W. DUDAS
*Director of the United States Patent and Trademark Office*